(12) United States Patent
Laricchia et al.

(10) Patent No.: US 9,394,188 B2
(45) Date of Patent: Jul. 19, 2016

(54) PROCESS FOR OXIDIZING SULFIDES AND AN APPARATUS RELATING THERETO

(71) Applicant: UOP, LLC, Des Plaines, IL (US)

(72) Inventors: Luigi Laricchia, Arlington Heights, IL (US); Javier Rios, Montgomery, IL (US)

(73) Assignee: UOP LLC, Des Plaines, IL (US)

( * ) Notice: Subject to any disclaimer, the term of this patent is extended or adjusted under 35 U.S.C. 154(b) by 355 days.

(21) Appl. No.: 13/745,317

(22) Filed: Jan. 18, 2013

(65) Prior Publication Data

US 2014/0202963 A1 Jul. 24, 2014

(51) Int. Cl.
  *C02F 1/72* (2006.01)
  *C02F 1/66* (2006.01)
  *C02F 103/36* (2006.01)

(52) U.S. Cl.
  CPC . *C02F 1/725* (2013.01); *C02F 1/66* (2013.01); *C02F 2103/365* (2013.01); *C02F 2209/02* (2013.01); *C02F 2209/03* (2013.01); *C02F 2301/08* (2013.01)

(58) Field of Classification Search
  CPC ............... C02F 1/725; C02F 2101/101; C02F 2101/40; C02F 2103/18; C02F 2103/36; C02F 2103/365; C02F 2209/26; C02F 2303/02; C02F 1/66; C02F 2209/02; C02F 2209/0326
  See application file for complete search history.

(56) References Cited

U.S. PATENT DOCUMENTS

| | | | |
|---|---|---|---|
| 1,889,942 A | 12/1932 | Baehr | |
| 2,587,149 A | 2/1952 | Gwynn | |
| 3,186,942 A | 6/1965 | Benger | |
| 3,205,164 A * | 9/1965 | Brown | 208/236 |
| 3,672,836 A * | 6/1972 | Brown | 423/571 |
| 3,761,409 A | 9/1973 | McCoy et al. | |
| 4,076,621 A * | 2/1978 | Hardison | 210/698 |
| 4,318,825 A | 3/1982 | Frame | |
| 4,582,690 A | 4/1986 | Rempel et al. | |
| 5,207,927 A | 5/1993 | Marinangeli et al. | |
| 5,470,486 A | 11/1995 | Gillespie | |
| 6,017,501 A | 1/2000 | Waycuilis | |
| 6,482,377 B2 | 11/2002 | Bartley et al. | |
| 6,576,144 B1 | 6/2003 | Vineyard | |
| 7,326,333 B2 | 2/2008 | Laricchia et al. | |
| 7,998,447 B2 | 8/2011 | Elwart et al. | |
| 2005/0180914 A1 | 8/2005 | Keller et al. | |
| 2009/0065434 A1 | 3/2009 | Zhang | |
| 2012/0000826 A1 | 1/2012 | Tertel | |
| 2012/0000827 A1 | 1/2012 | Krupa et al. | |

FOREIGN PATENT DOCUMENTS

| | | |
|---|---|---|
| CA | 2188063 A1 | 4/1998 |
| RU | 2385759 C2 | 4/2010 |

OTHER PUBLICATIONS

"Charles' Law" obtained from www.passmyexams.co.uk (obtained Nov. 2015).*
"Gay_Lussacs Pressure Law" obtained from www.passmyexams.co.uk (obtained Nov. 2015).*
Search Report dated Apr. 29, 2014 for corresponding PCT Appl. No. PCT/US2014/011763.
Abstract of CN101495404 Published Jul. 29, 2009.
Abstract of CN 101798068 Published Aug. 11, 2010.

* cited by examiner

*Primary Examiner* — Lucas Stelling

(57) ABSTRACT

One exemplary embodiment can be a process for oxidizing sulfides. The process can include passing an alkaline stream having about 1-about 30%, by weight, of an alkaline material and one or more sulfide compounds to a reaction zone having a metal phthalocyanine catalyst.

18 Claims, 1 Drawing Sheet

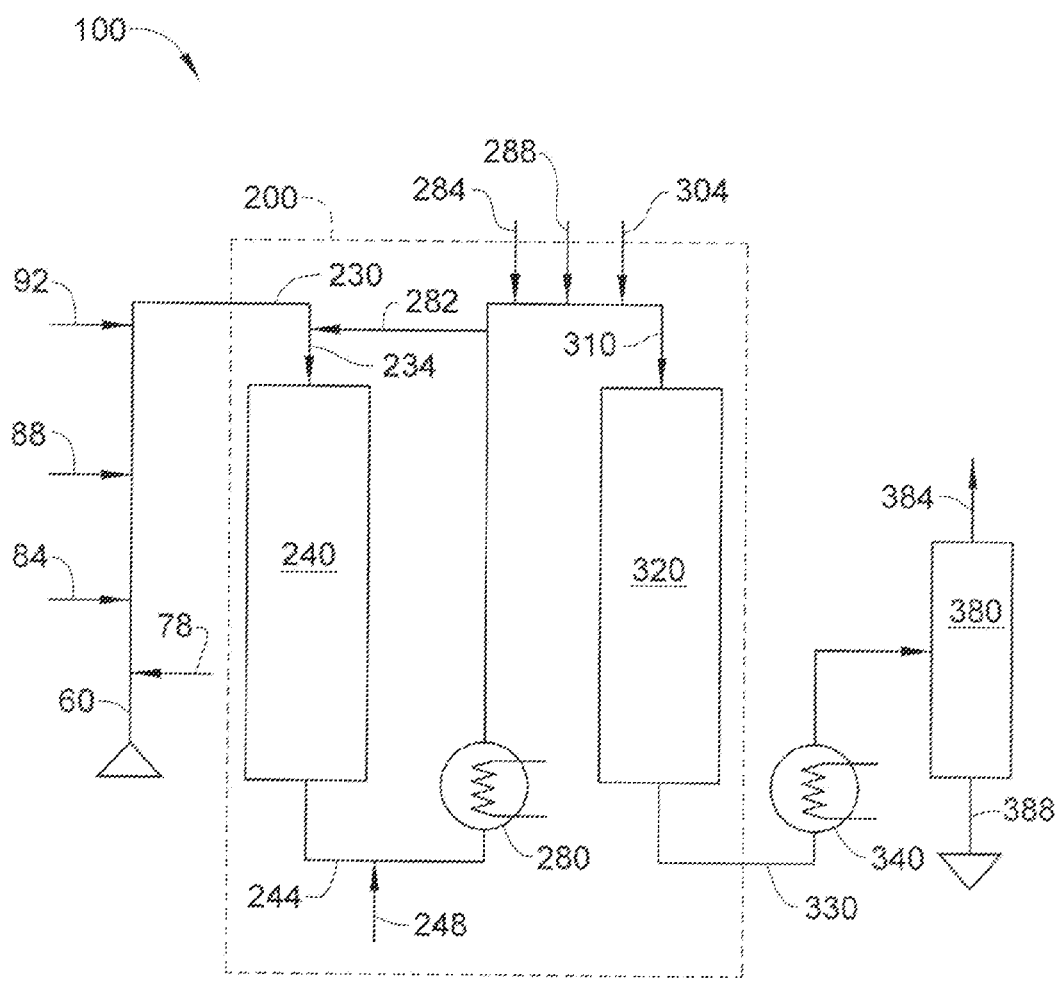

though usually at the same or a lower concentration than in the feed 230 of the reactor 240.

PROCESS FOR OXIDIZING SULFIDES AND AN APPARATUS RELATING THERETO

FIELD OF THE INVENTION

This invention generally relates to a process for oxidizing sulfides and an apparatus relating thereto.

DESCRIPTION OF THE RELATED ART

Impurities in waste water from petroleum refineries can include sulfide compounds. These sulfides when disposed in streams can consume oxygen to the detriment of aquatic life. Hence, there is a desire to fully oxidize sulfides to sulfates. Partial oxidation can convert sulfides to thiosulfates, but this may only achieve a reduction of oxygen demand of fifty percent.

SUMMARY OF THE INVENTION

One exemplary embodiment can be a process for oxidizing sulfides. The process can include passing an alkaline stream having about 1-about 30%, by weight, of an alkaline material and one or more sulfide compounds to a reaction zone having a metal phthalocyanine catalyst.

Another exemplary embodiment may be an apparatus for oxidizing sulfides. The apparatus can include a reaction zone and a tank for venting gases. Generally, the reaction zone includes a first reactor, an interstage cooler, and a second reactor. Often, at least one of the first and second reactors contains a metal phthalocyanine catalyst.

A further exemplary embodiment can be a process for oxidizing one or more sulfides into sulfates. Generally, the process includes adding an oxygen-containing gas and carbon dioxide to an alkaline stream comprising about 1-about 30%, by weight, of an alkaline material and one or more sulfide compounds, passing the alkaline stream to a reaction zone having a metal phthalocyanine catalyst, and venting one or more gases from an effluent from the reaction zone.

The embodiments herein can provide a complete or almost complete reduction of oxygen demand by utilizing two reactors in series loaded with oxidizing catalysts, such as a metal phthalocyanine catalyst. In another exemplary embodiment, a complete oxidation of sulfides to sulfates at operating conditions of about 25-about 150° C., and a pressure of about 440-about 1,830 KPa may be accomplished. Moreover, plugging can be alleviated by utilizing an activated charcoal support of sufficient size or injecting stripped sour water derived from the sour water stripper to prevent thiosulfate precipitation. Additionally, two-stage cooling, such as an interstage cooler and product cooler, may be used to minimize the change in temperature and reduce corrosion issues.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "alkali" can mean any substance or material that in solution, typically a water solution, has a pH value greater than about 7.0, and exemplary alkali can include sodium hydroxide, potassium hydroxide, or ammonia. Such an alkali in solution may be referred to as an alkaline solution or an alkaline.

As used herein, the term "phase" may mean a liquid, a gas, or a suspension including a liquid and/or a gas, such as a foam, aerosol, or fog. A phase may include solid particles. Generally, a fluid can include one or more gas, liquid, and/or suspension phases.

As used herein, the term "parts per million" may be abbreviated herein as "ppm" and "weight ppm" may be abbreviated herein as "wppm".

As depicted, process flow lines in the FIGURES can be referred to, interchangeably, as, e.g., lines, pipes, branches, distributors, streams, effluents, feeds, products, portions, catalysts, withdrawals, recycles, suctions, discharges, and caustics.

BRIEF DESCRIPTION OF THE DRAWING

The FIGURE is a schematic depiction of an exemplary apparatus for oxidizing sulfides.

DETAILED DESCRIPTION

Referring to the FIGURE, an apparatus 100 for oxidizing sulfides can include a reaction zone 200, a cooler 340, and a tank 380. The reaction zone 200 can include a first reactor 240, an interstage cooler 280, and a second reactor 320. Generally, an alkaline stream 60 can be obtained from a hydrocarbon purification process. Such a hydrocarbon purification process can include contacting a hydrocarbon stream with a caustic stream to facilitate the removal of sulfur. Afterwards, spent caustic is removed from the process. The alkaline stream 60 can comprise a portion of this spent caustic, although other alkalines may be comprised instead or additionally. The alkaline stream 60 may contain about 1-about 30, about 1-about 10, or about 1-about 6%, by weight, of an alkaline material.

Several streams can be added to the alkaline stream 60, namely a stripped sour water steam 78, an oxygen-containing, typically air, stream 84, and a carbon dioxide containing stream 88. Optionally, an oxidizing catalyst stream 92, which can include any suitable amount of oxidizing catalyst, may also be added to form a feed 230. The oxidizing catalyst is discussed in further detail below. A recycle stream 282 may be combined with the feed 230 to form a total first feed 234 provided to the first reactor 240.

The first reactor 240 can contain an oxidizing catalyst, usually a metal phthalocyanine catalyst. Such catalyst can include a support and a catalytic component, often a metal phthalocyanine compound.

Examples of a suitable support for metal phthalocyanines are charcoal, such as wood charcoal or bone charcoal, which may or may not be activated prior to use; naturally occurring or synthetically prepared refractory inorganic oxides such as alumina, silica, zirconia, kieselguhr, bauxite, pillared clay, and high silica zeolites; and activated carbons. A preferred support is an activated carbon support of sufficient size to prevent plugging.

Preferred metal phthalocyanine compounds include those of groups 8-10 of the Periodic Table and vanadium. Other metal phthalocyanine compounds that may be utilized include those of copper, magnesium, titanium, hafnium, tantalum, silver, zinc, tin, molybdenum, manganese, or tungsten. A particularly preferred metal phthalocyanine is a cobalt phthalocyanine compound. Moreover, any suitable derivative of the metal phthalocyanine may be employed including the sulfonated derivatives and the carboxylated derivatives, with the monosulfonated and polysulfonated derivative being particularly preferred, e.g. cobalt phthalocyanine monosulfonate, cobalt phthalocyanine disulfonate or a mixture thereof being particularly preferred. The sulfonated derivatives may be prepared, for example, by reacting cobalt, vanadium, or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The amount of the phthalocyanine compound combined with the support may be any amount, which can be catalytically effective. However, because of the high activity of the metal phthalocyanine catalyst, good results are ordinarily obtained when it comprises about 0.001-about 5%, by weight, of the catalyst with desired results obtained when it comprises about 0.01-about 2%, by weight, of the catalyst.

In another exemplary embodiment, a solid adsorptive support with a metal chelate may be contacted with a substituted ammonium compound, and thereafter may be heated with the resulting catalyst to a temperature above ambient temperature. The contacting of the solid adsorptive support with the metal chelate and the substituted ammonium compound may be performed concurrently or consecutively. If the contacting is performed consecutively, it is preferable to contact the solid adsorptive support first with the metal chelate and thereafter with the substituted ammonium compound. One exemplary substituted ammonium hydroxide is a dimethylbenzylalkylammonium hydroxide.

The solid adsorptive support may be in the form of spheres, pills, pellets, granules, or other suitable regular or irregular size and shape for carrying the metal chelate and substituted ammonium compound. The method of contacting the solid adsorptive support with the metal chelate and the substituted ammonium compound can be dipping, soaking, suspending, or otherwise immersing the solid adsorptive support in solutions or dispersions of the metal chelate and of the substituted ammonium compound, or in a common solution or dispersion of the metal chelate and the substituted ammonium compound. Alternatively, the solutions or dispersions of the metal chelate and of the substituted ammonium compound, or the common solution or dispersion of the metal chelate and the substituted ammonium compound, can be sprayed onto, poured over, or otherwise contacted with the solid adsorbent support.

The resulting catalyst can be heated to a temperature above ambient temperature in any conventional or otherwise convenient manner. The temperature to which the resulting catalyst is heated is preferably in the range of about 50-about 200° C., and most preferably in the range of about 90-about 130° C. The temperature should be below the temperature at which either the metal chelate or the substituted ammonium compound decomposes.

The catalyst would be more conveniently available for storage, transportation and use if maintained in a dry state. In addition, use of the catalyst in a fixed bed operation would require that the catalyst be in a dry state. Thus, use of the catalyst would usually require the evaporation of solvents remaining after contacting the metal chelate and the substituted ammonium compound. Suitable catalysts are disclosed in, e.g., U.S. Pat. No. 4,318,825 and U.S. Pat. No. 5,207,927, for use in the first reactor 240 and second reactor 320.

An effluent 244 exiting the first reactor 240 can be combined with a stripped sour water stream 248 and passed through the interstage cooler 280. A portion may be recycled as a recycle stream 282 and combined with the feed 230. The remainder can be combined with an oxygen-containing stream 284, a carbon dioxide stream 288, and a further oxidizing catalyst stream 304 to form a second feed 310 for the second reactor 320. The oxidizing catalyst stream 304 may contain a suitable amount of oxidizing catalyst, as described above.

The reaction zone 200, as well as, independently, the first reactor 240 and the second reactor 320, can operate, independently, at a temperature of about 25-about 150° C., and a pressure of about 440-about 1,830 KPa, preferably about 35-about 95° C., and a pressure of about 790-about 1,480 KPa. The second reactor 320 may provide a reaction zone effluent 330 that can be passed through a cooler 340, and then to a tank 380 for venting gases. A gas stream 384 can be obtained from the top of the tank 380 and a bottom stream 388. The bottom stream 388 can be sufficiently oxidized to allow disposal in, e.g., a fresh water stream.

The embodiments disclosed herein can provide a high catalyst activity allowing operation at a lower severity, e.g., lower temperatures and pressures. What is more, injection can maintain or sustain catalyst activity across both reactors and therefore, may achieve on-stream efficiency. Using two reactors in series can minimize temperature differentials, and therefore, corrosion in both reactors. Moreover, optional coarser activated charcoal as catalyst support may minimize pressure drops across reactors. Coolers after each reactor can also be utilized to avoid high temperatures, and thus corrosion. Additionally, product recycling from the first reactor to that same reactor can serve as a quench. Moreover, dilution with water, obtained from a sour water stripper or other apparatus, can minimize thiosulfate precipitation.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A process for oxidizing sulfides, comprising:
   passing an alkaline stream comprising about 1-about 30%, by weight, of an alkaline material and one or more sulfide compounds to a reaction zone comprising a metal phthalocyanine catalyst; and adding a stripped sour water stream to the alkaline stream, wherein the reaction zone operates at a pressure of about 440-about 1,830 KPa.

2. The process according to claim 1, wherein the metal phthalocyanine catalyst comprises cobalt.

3. The process according to claim 1, wherein the metal phthalocyanine catalyst comprises an activated carbon support.

4. The process according to claim 1, wherein the reaction zone operates at a temperature of about 25-about 150° C.

5. The process according to claim 1, wherein the reaction zone operates at a temperature of about 35-about 95° C., and a pressure of about 790-about 1,480 KPa.

6. The process according to claim 1, wherein the reaction zone comprises a first reactor and a second reactor.

7. The process according to claim 6, wherein the reaction zone further comprises an interstage cooler cooling an effluent from the first reactor upstream of the second reactor.

8. The process according to claim 1, further comprising cooling an effluent from the reaction zone.

9. The process according to claim 8, further comprising venting the cooled effluent to remove a gas stream.

10. The process according to claim 7, further comprising providing another metal phthalocyanine catalyst to a feed to the first reactor.

11. The process according to claim 7, further comprising providing another metal phthalocyanine catalyst to the effluent from the first reactor upstream of the second reactor.

12. The process according to claim 10, further comprising recycling at least a portion of the cooled effluent from the first reactor and combining with the feed to the first reactor.

13. The process according to claim 1, further comprising adding at least one of an oxygen-containing gas and a carbon dioxide containing gas to the alkaline stream.

14. An apparatus for oxidizing sulfides, comprising:
  A) a reaction zone, in turn comprising:
   1) a first reactor;
   2) an interstage cooler; and
   3) a second reactor;
   wherein at least one of the first and second reactors contains a metal phthalocyanine catalyst,
  B) a tank for venting gases;
  C) a cooler downstream of the second reactor and upstream of the tank; and a stripped sour water stream source in upstream communication with the interstage cooler.

15. The apparatus according to claim 14, wherein the metal phthalocyanine catalyst comprises cobalt.

16. A process for oxidizing one or more sulfides into sulfates, comprising:
  A) adding an oxygen-containing gas stream and a separate carbon dioxide stream to an alkaline stream comprising about 1-about 30%, by weight, of an alkaline material and one or more sulfide compounds;
  B) passing the alkaline stream to a reaction zone comprising a metal phthalocyanine catalyst;
  C) venting one or more gases from an effluent from the reaction zone; and
  D) adding a stripped sour water stream to the alkaline stream.

17. The process according to claim 16, wherein the metal phthalocyanine catalyst comprises cobalt and an activated carbon support.

18. The process according to claim 16, wherein the alkaline stream comprises about 1-about 6%, by weight, of the alkaline material.

* * * * *